W. V. TURNER.
BRAKE SYSTEM.
APPLICATION FILED FEB. 20, 1918.
1,316,204.
Patented Sept. 16, 1919.
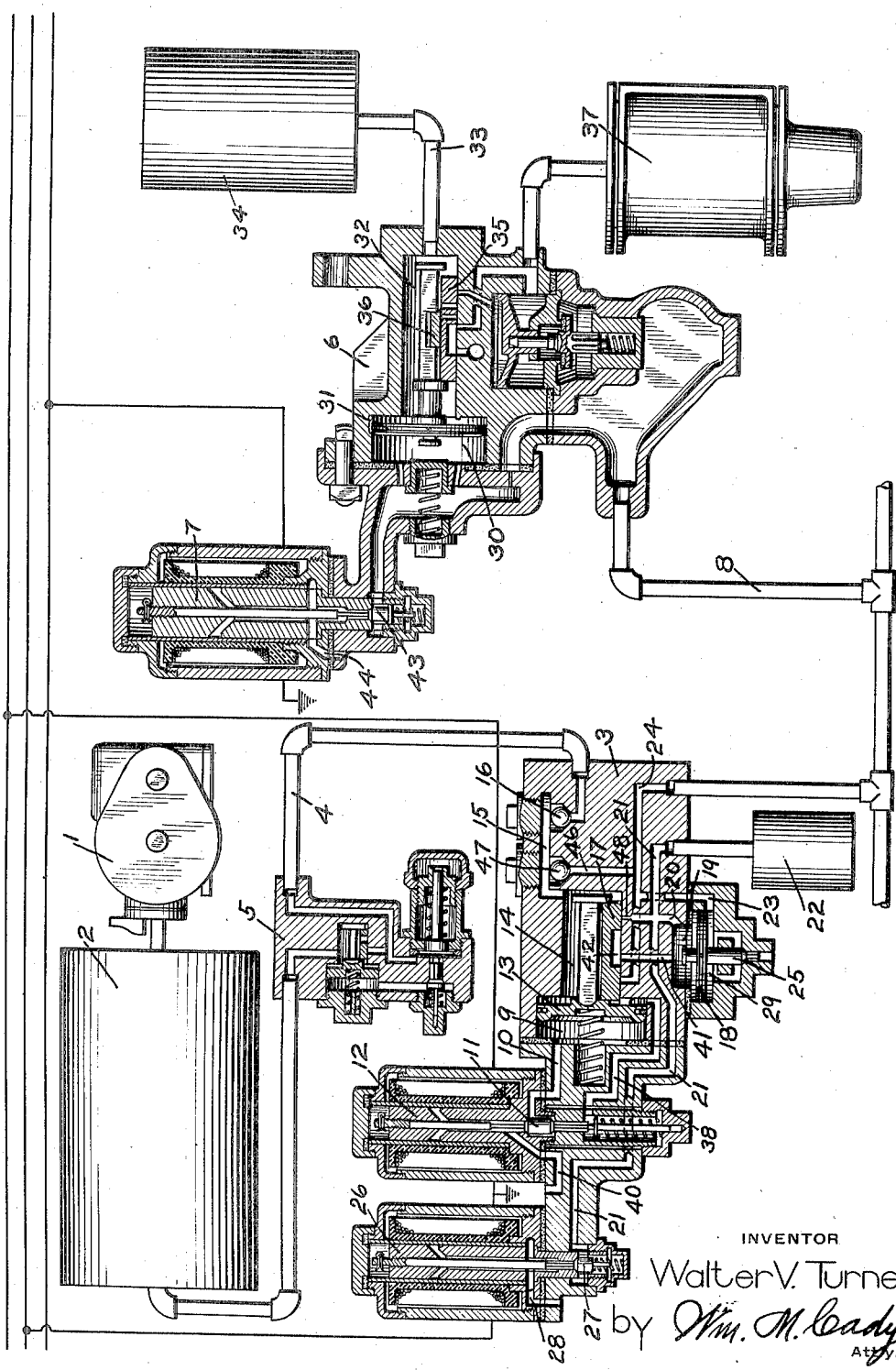
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE SYSTEM.

1,316,204. Specification of Letters Patent. Patented Sept. 16, 1919.

Application filed February 20, 1918. Serial No. 218,360.

*To all whom it may concern:*

Be it known that I, WALTER V. TURNER, a citizen of the United States, residing at Wilkinsburg, in the county of Allegheny and State of Pennsylvania, have invented new and useful Improvements in Brake Systems, of which the following is a specification.

This invention relates to fluid pressure brakes, such as are employed for controlling railway trains.

More particularly on long freight trains, considerable time is required to fully charge the brake system with fluid under pressure throughout the train.

This charging time, which may be of excessive duration on account of undue leakage on cars with poorly maintained equipments, interferes with train movements, especially where the regulations require that the train should not be moved until the brake system has been fully charged.

Furthermore, where such trains are in motion, the application and release of the brakes, more particularly an emergency application of the brakes, is often attended with a violent running in and out of the slack, due to the elapsed time between the application or release of the brakes as between the first and last cars of the train.

The principal object of my invention is to provide means for overcoming the above difficulty by providing means on certain cars of the train distributed at intervals throughout the train for charging the brake pipe of the brake system, so as to reduce the time required to fully charge the brake system.

Other objects and advantages will appear in the following more detailed description of the invention.

In the accompanying drawing, the single figure is a diagrammatic view, partly in section, of a fluid pressure brake equipment embodying my invention.

As shown in the drawing, the equipment may comprise a fluid compressor 1, driven by an internal combustion engine or other means, for compressing fluid into a main reservoir 2, an electrically controlled application and release valve device 3, connected by pipe 4 containing a feed valve device 5 to main reservoir 2, and a triple valve device 6, provided with an emergency application magnet 7 and connected to brake pipe 8.

The application and release valve device 3 may comprise a casing having a piston chamber 9, connected by passage 10 to a double beat valve 11 controlled by a release magnet 12, and containing a piston 13, and having a valve chamber 14, connected by passage 15, containing a ball check valve 16, to main reservoir pipe 4, and containing a slide valve 17, adapted to be operated by piston 13.

The valve device 3 may also include an equalizing discharge valve mechanism similar to the equalizing discharge valve mechanism of the usual engineer's brake valve and comprising a piston 18 having the chamber 19 at one side connected by passages 20 and 21, to an equalizing reservoir 22 and having the chamber 29 at opposite side connected by passages 23 and 24 to brake pipe 8.

The piston 18 is adapted to operate a discharge valve 25 for venting fluid from the brake pipe 8 for effecting a service application of the brakes.

For operating the equalizing discharge valve mechanism, a service magnet 26 is provided, which controls a valve 27 adapted to vent fluid from the equalizing reservoir 22 and chamber 19 through passage 21 to an atmospheric exhaust port 28.

The triple valve device 6 may comprise a casing having the usual piston chamber 30, connected to brake pipe 8 and containing piston 31, and a valve chamber 32 connected by pipe 33 to auxiliary reservoir 34 and containing a main slide valve 35 and an auxiliary valve 36 adapted to be operated by piston 31 for controlling the admission and release of fluid to and from a brake cylinder 37 in the usual manner.

In operation, cars equipped with apparatus above described are distributed at desired points throughout the train, and the controlling magnets are connected by train wires to the head end of the train, so that the apparatus may be controlled from the locomotive.

Each compressor in the train operates to compress fluid into its main reservoir 2, from which fluid is supplied at a pressure reduced by the feed valve 5 to the valve device 3, charging the valve chamber 14 with fluid under pressure. Normally the application and release magnets 26 and 12 are not energized, so that the release magnet 12 operates the double beat valve 11 to close the exhaust port 40 and open communication from passage 38 leading to valve chamber 14, to passage 10. The fluid pressure in piston chamber 9 is thus equalized with the fluid pressure in valve chamber 14, permitting the spring 39 to shift the piston 13 to lap position, as shown in the drawing.

In charging the brake system with fluid under pressure, the release magnet 12 is energized, so as to operate the double beat valve 11 to cut off the supply passage 38 and vent fluid from piston chamber 9 through passage 10 to exhaust port 40. The piston 13 then shifts the valve 17 so that passage 20 is uncovered, permitting the equalizing reservoir 22 and chamber 19 to be charged with fluid under pressure from valve chamber 14.

The valve 17 also connects a passage 41 through cavity 42 with passage 24, so that fluid is supplied from chamber 19 to the brake pipe 8. Thus on each car equipped with the above described apparatus, fluid is supplied to the brake pipe to facilitate the quick charging of the brake system.

In order to effect an electric service application of the brakes, the service magnet 26 is energized and the release magnet 12 is deënergized.

The deënergization of the release magnet 12 operates the double beat valve 11 to supply fluid to piston chamber 9, so that the fluid pressures on the piston 13 are equalized and the spring shifts the piston 13 to lap position, so that valve 17 closes the passage 20 and cuts off communication between passages 41 and 24.

The energization of service magnet 26 operates to shift the valve 27 so as to connect passage 21 with exhaust port 28. The fluid pressure in the equalizing reservoir 22 and in chamber 19 is then reduced, so that the higher brake pipe pressure in chamber 29 operates piston 18 to open valve 25 and vent fluid from the brake pipe 8, the amount of reduction in brake pipe pressure being determined by the time the service magnet is kept energized.

The reduction in brake pipe pressure thus produced operates the triple valves throughout the train to effect a service application of the brakes in the usual manner.

In order to release the brakes, the service magnet 26 is deënergized and the release magnet 12 is energized so that the piston 13 and valve 17 are shifted to the position for recharging the brake pipe and thereby effecting the release of the brakes.

An emergency application of the brakes may be effected by deënergizing the release magnet 12 as in a service application of the brakes, and by energizing the emergency magnet 7 so as to operate valve 43 to vent fluid from the triple valve piston chamber 30 and also from the brake pipe 8 to exhaust port 44.

A passage 46 connects passage 24 with passage 15, so that in case the main reservoir pressure fails on a car, the equalizing reservoir 22 will be charged with fluid under pressure from the brake pipe, permitting the apparatus to operate to effect a service application of the brakes. A ball check valve 47 is interposed in passage 46, so as to prevent main reservoir pressure from flowing directly to the brake pipe.

The ball check valve 16 prevents loss of pressure in case the main reservoir pipe 4 should break.

The passage 20 is restricted at 48 in order to prevent main reservoir pressure from flowing to the brake pipe, at such a rate as might interfere with obtaining an emergency rate of reduction in brake pipe pressure in case of a break-in-two of the train or a broken brake pipe.

Having now described my invention, what I claim as new and desire to secure by Letters Patent, is:—

1. In a fluid pressure brake, the combination with a brake pipe, of a source of fluid under pressure on designated cars of a train, means for supplying fluid from each source to the brake pipe, and a check valve for preventing back-flow from the brake pipe to the source of pressure.

2. In a fluid pressure brake, the combination with a brake pipe, of a source of fluid under pressure on designated cars of a train and means controlled electrically from the head of the train for effecting the supply of fluid from each source of fluid pressure to the brake pipe.

3. In a fluid pressure brake, the combination with a brake pipe, of a reservoir on a car of a train, a compressor for compressing fluid into said reservoir, and electrically controlled means operated from the head of the train for supplying fluid from said reservoir to the brake pipe.

4. In a fluid pressure brake, the combination with a brake pipe, of a storage reservoir on a car of a train, a compressor for compressing fluid into said reservoir, a feed valve device for reducing the pressure of fluid supplied from said reservoir, and means controlled electrically from a distant point in the train for supplying fluid from the reservoir through the feed valve device to the brake pipe.

5. In a fluid pressure brake, the combination with a brake pipe, of a source of fluid under pressure on a car of a train, a valve device for controlling communication from said source to the brake pipe, and a magnet controlled valve for effecting the operation of said valve device.

6. In a fluid pressure brake, the combination with a brake pipe, of a source of fluid under pressure on a car of a train, an equalizing discharge valve mechanism for venting fluid from the brake pipe, a valve device for controlling the supply of fluid from said source to the brake pipe and to one side of said equalizing discharge valve mechanism, and a magnet controlled valve for effecting the operation of said valve device.

7. In a fluid pressure brake, the combination with a brake pipe, of a source of fluid under pressure, an equalizing discharge valve mechanism for venting fluid from the brake pipe, a valve device operated by fluid pressure for controlling the supply of fluid from said source to one side of said equalizing valve mechanism, a magnet controlled valve for varying the fluid pressure on said valve device for operating same, and a magnet controlled valve for effecting the operation of said equalizing discharge valve mechanism.

8. In a fluid pressure brake, the combination with a brake pipe, of an equalizing reservoir, equalizing discharge valve mechanism subject on one side to the pressure of the equalizing reservoir for venting fluid from the brake pipe, an electrically controlled valve device for controlling the charging of the equalizing reservoir with fluid under pressure, and electrically controlled means for venting fluid from said reservoir to effect the operation of said equalizing valve mechanism.

In witness whereof I have hereunto set my hand.

WALTER V. TURNER.